United States Patent [19]
Brown et al.

[11] Patent Number: 4,790,418
[45] Date of Patent: Dec. 13, 1988

[54] TRANSMISSION CLUTCH LOOP TRANSFER CONTROL

[75] Inventors: Larry T. Brown, Westland; Davorin D. Hrovat, Dearborn, both of Mich.

[73] Assignee: Ford Motor Company, Dearborn, Mich.

[21] Appl. No.: 44,094

[22] Filed: Apr. 30, 1987

[51] Int. Cl.[4] .................. B60K 41/02; F16D 43/284; F16D 43/286
[52] U.S. Cl. .................. 192/0.032; 192/0.092; 192/3.58; 192/54; 192/103 F; 74/752 A
[58] Field of Search ............... 192/0.032, 0.052, 0.092, 192/3.58, 12 C, 48.9, 0.076, 103 F, 54; 74/752 A, 866

[56] References Cited

U.S. PATENT DOCUMENTS

| | | | |
|---|---|---|---|
| 3,956,947 | 5/1976 | Leising et al. | 74/752 A |
| 4,360,092 | 11/1982 | Müller et al. | 192/12 C |
| 4,527,678 | 7/1985 | Pierce et al. | 192/3.58 |
| 4,685,356 | 8/1987 | Iwatsuki | 74/866 |

OTHER PUBLICATIONS

Article—Bond Graph Modeling of Dominant Dynamics of Automotive Power Trains by Hrovat et al.
Article—Bond Graph Modeling and Computer Simulation of Automotive Torque Converters by Hrovat et al.
Article—Ratio Changing the Passenger Car Automatic Transmission by Winchell et al.

Primary Examiner—Rodney H. Bonick
Assistant Examiner—David A. Testardi
Attorney, Agent, or Firm—Frank G. McKenzie; Donald J. Harrington

[57] ABSTRACT

A method for controlling the transfer of load from one friction element to another friction element while making a gear ratio change in an automatic transmission. The synchronous engine speed is increased by slipping the offgoing clutch. A constant is calculated from known speed ratios of the gear set, engine inertia, the difference in engine speed from synchronous speed and a constant that corresponds to the output torque at the end of the torque phase of the gear ratio shift. The time rate of change of the offgoing clutch torque is calculated and the clutch pressures are changed in accordance with the calculated torque slope.

6 Claims, 2 Drawing Sheets

TRANSMISSION CLUTCH LOOP TRANSFER CONTROL

BACKGROUND OF THE INVENTION

1. Field of the Invention

This invention relates to a control for changing the gear ratios of an automatic transmission. More particularly, it pertains to a control of the hydraulic pressure supplied to the clutches and brakes of an automatic transmission whose engagement and disengagement selectively produce the various speed ratios of the transmission.

2. Description of the Prior Art

The speed ratio of an automatic transmission can be upshifted by disengaging a first clutch, whose engagement holds a member of the gear set against rotation and causes the lower speed ratio to be produced, and by engaging a second clutch or brake, whose engagement combined with the disengagement of the first clutch holds another member of the gear set and causes operation at the higher speed ratio. Ideally, the output torque of the transmission is constant or changes smoothly and imperceptibly during the ratio change. Hydraulic pressure is supplied to certain clutches and brakes, and others of these are vented selectively to produce engagement and disengagement.

A power-on upshift of an automatic transmission involves an output torque transient whose earliest portion produces decreasing acceleration of the motor vehicle and whose latter portion produces increasing acceleration as the transmission speed ratio increases. The upshift transient has a first or torque phase, during which torque changes occur on the clutches and transmission output without a speed change and thus without inertia torques. The transient has also a second or inertial phase, during which the clutch elements are accelerated to their new speeds with associated inertia torque. During the torque phase, the output torque of the transmission is a function of the torque produced by the engine and the torque carried by the clutches. During the inertia phase, the output torque of the transmission is a function only of clutch torque, in a transmission where an overrunning clutch provides the reaction at the higher gear ratio. Where a friction element such as a clutch or brake is used instead of an overrunning clutch for this purpose during the inertia phase, the output torque of the transmission is a function of the engine torque, clutch torque and the torque on the reaction friction element.

During this transient, a passenger first senses decreasing acceleration during the torque phase followed by an abrupt change to an increasing acceleration as the torque is transferred from one friction element to another. If the clutch torque is not carefully limited, the change in output torque when the speed change is completed will be sensed by the passenger as a decreasing acceleration. The prior art has taught that the decreasing output torque during the torque phase is an inherent characteristic of a power-on upshift and is unavoidable, particularly so, when the output torque before the shift equals the output torque after the shift.

SUMMARY OF THE INVENTION

In the control method according to this invention, the ideal power-on upshift can be realized without the substantial decrease in output torque during the shift change, formerly considered a necessary characteristic of a power-on upshift. The result is an essentially imperceptible upshift even in a driveline that does not include a torque converter, which normally is present to absorb torque transients and to amplify torque.

In the application of the method of this invention, first the pressure in the offgoing clutch element is decreased until the slip across this element increases enough to permit a predetermined increase in the engine speed. This slip is then maintained throughout the closed-loop electronic control of the hydraulic pressure supplied to the offgoing friction element. During the portion of the upshift while load is transferred from one friction element to another, a load transfer constant is calculated off-line and this value is stored in memory that is accessible to a microcomputer. When the desired slip across the first friction element has increased and the engine speed has increased to the predetermined value, a calculation is made of the time rate of change of the hydraulic pressure to be supplied during the torque phase of the upshift to the offgoing and oncoming friction elements. The transfer of load from one friction element to another is achieved during the torque phase by changing the hydraulic pressure in the oncoming and offgoing friction elements at predetermined rates, which are related to the previously calculated slopes.

During the conventional transfer of engine torque between the friction elements of an automatic transmission, the engine speed is maintained constant and therefore creates the output torque depression indicated in FIG. 2. However, under the control of the method according to this invention, at the beginning of the torque phase, engine inertia, or the equivalent rotating inertia of other components of the driveline, is used to avoid as much of the output torque reduction as is deemed necessary to complete the power-on upshift or downshift so that the output torque changes smoothly without abrupt transients formally believed a necessary characteristic of a power-on upshift.

DESCRIPTION OF THE PREFERRED EMBODIMENTS

Figure 1:
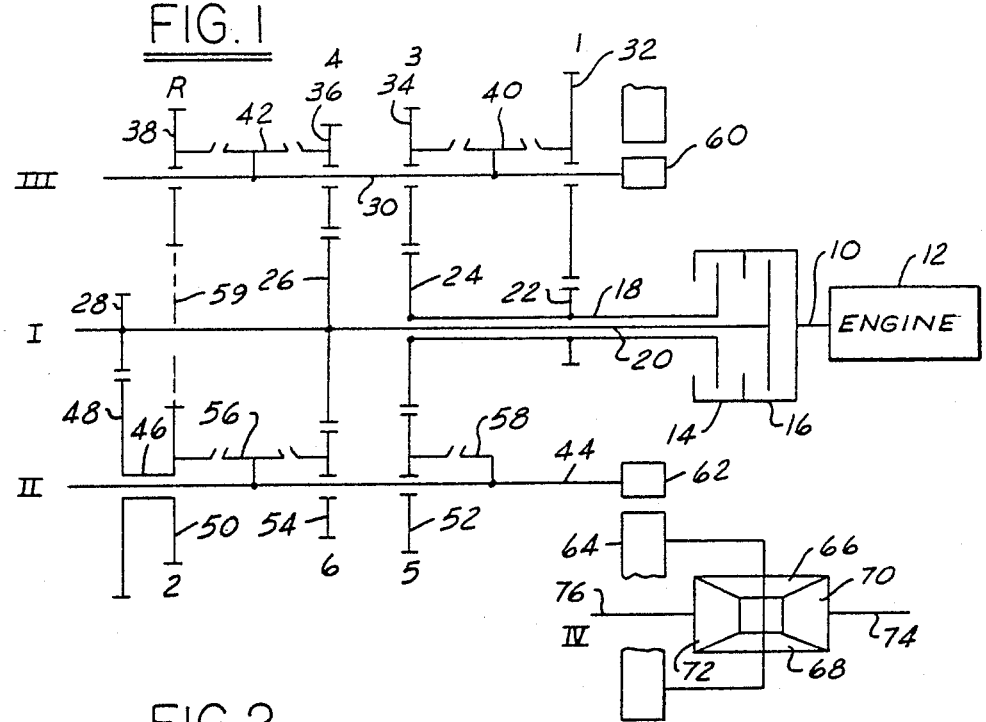
FIG. 1 is a schematic diagram of a gear set and clutch arrangement of an automatic transmission suited for control by the system according to this invention.

Referring first to FIG. 1, the crankshaft 10 of an engine 12 or other power source is adapted for connection by first and second clutches 14, 16 to first and second driveshafts 18, 20, respectively. The clutches are engaged by directing pressurized hydraulic fluid to the associated clutch servo and are disengaged by venting the servo.

Input shaft 18 is a sleeve shaft through which input shaft 20 extends. Support for the shaft is provided by bearings retained in recesses formed in the transmission case.

Shaft 18 has a first forward speed ratio pinion 22 and a third-fifth forward speed ratio pinion 24 fixed to the shaft. Input shaft 20 has a fourth-sixth forward speed ratio pinion 26 and a second forward speed-reverse drive pinion 28 fixed to the shaft.

A first countershaft 30 rotatably supported on the transmission casing parallel to the axis of the input shafts supports first, third and fourth forward speed ratio gears 32, 34, 36 and reverse gear 38, all of which are journalled on the surface of the countershaft. Located between gears 32 and 34 is a coupler or synchronizer clutch 40, whose hub is fixed to the countershaft and is adapted to drivably connect gears 32 and 34 selectively to the countershaft by engagement of the synchronizer clutch sleeve with the dog teeth carried on gear wheels 32, 34. Located between gears 36 and 38 is a coupler or synchronizer clutch 42, whose hub is fixed to countershaft 30 and is adapted to selectively drivably connect gears 36 and 38 to the countershaft by sliding the synchronizer clutch sleeve into engagement with the dog teeth formed on gear wheels 36, 38.

A second countershaft 44 is rotatably supported on the transmission casing parallel to the axis of the input shafts. Journalled on the surface of countershaft 44 is a gear wheel 46 that includes reverse pinion 50 and a second speed gear 48. Also journalled on countershaft 44 are a fifth speed gear 52 and a sixth speed gear 54. Located between gears 50 and 54 is a third coupler or synchronizer clutch 56, whose hub is fixed to countershaft 44 and is adapted to selectively drivably connect gears 50 and 54 to the countershaft by sliding the clutch sleeve into engagement with dog teeth carried on the gear wheels. A fourth coupler or synchronizer clutch 58 has its hub fixed to countershaft 44 and is adapted to selectively drivably connect gear 52 to the countershaft by engaging dog teeth formed on the gear wheel. Reverse gear means 59 are in continuous meshing engagement with reverse pinion 50 and reverse gear 38.

Formed integrally with countershaft 30 is an output gear 60, and formed integrally with countershaft 44 is an output gear 62. The output gears are held in continuous meshing engagement with the differential input gear 64, which carries bevel pinions 66, 68 that are continuously engaged with side bevel gears 70, 72. Output gear 64 turns the carrier on which the bevel gears are supported, and axle shafts 74, 76, which are fixed to the side bevel gears, are driven rotatably about their axes through operation of the differential mechanism.

The first forward speed ratio is produced when clutch 14 is engaged, clutch 16 is disengaged, synchronizer clutch 58 is in its neutral position, the sleeve of synchronizer clutch 40 is moved rightward to the first speed ratio position, and the clutches of synchronizer clutches 42 and 56 are moved leftward to preselect the reverse and second speed ratios, respectively. With the transmission disposed in this way, crankshaft 10 is clutched to the first input shaft 18, pinion 22 drives gear 32, countershaft 30 is driven through synchronizer clutch 40 and output gear 60 drives the differential ring gear 64.

A speed ratio change to the second gear ratio results after friction clutch 14 is disengaged and clutch 16 is engaged. Thereafter, synchronizer 40 is shifted to the left thereby preselecting the third speed ratio, the sleeves of synchronizer clutches 42 and 58 are moved to their neutral positions and synchronizer clutch 56 is kept at its leftward position. The torque path for the second speed ratio therefore includes clutch 16, the second input shaft 20, input pinion 28, gears 48 and 50, synchronizer clutch 56, countershaft 44, output gear 62, differential ring gear 64, the differential mechanism, and axle shafts 74, 76.

Therefore, the transmission is characterized by two possible torque paths, one associated with odd-numbered gear ratios, the other with even-numbered gear ratios, and each is activated via appropriate clutch-synchronizer combinations. The mechanism for transferring the load from the first or offgoing clutch 14 to the second or oncoming clutch 16 while making a power-on upshift from the first speed ratio to the second speed ratio is described next with reference to FIG. 2. In the following development, it is assumed that I is the rotating engine inertia about its axis; however, the results can be applied with minor modifications to more general cases, such as those where I includes also the rotating inertia of a torque converter turbine and other rotating components of the driveline located between the clutches and the engine. Further, in the following development, it is assumed that engine torque is held constant while the load is transferred from the first clutch to the second clutch, and the vehicle speed is assumed to be constant during the load transfer from the first clutch to the second clutch.

Figure 2:
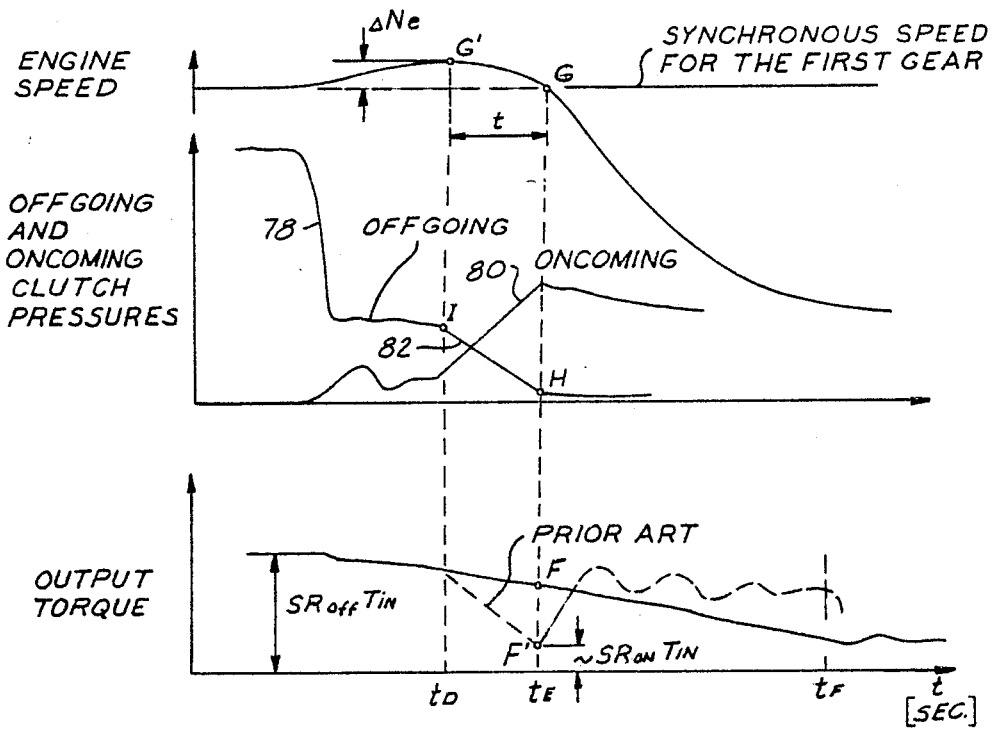
FIG. 2 is a graph showing the variation with time of engine speed, output torque and hydraulic pressure in the offgoing and oncoming function elements.

Referring now to FIG. 2, a power-on upshift from the first to the second gear ratio results when first the pressure in the offgoing clutch 14 is decreased at 78 until the slip across that clutch reaches a prescribed value corresponding to an increase in engine speed of $\Delta N_e$ revolutions per minute at point G'. This amount of slip is then maintained by controlling, through operation of the closed loop electronic control circuit, the pressure in the offgoing clutch 14.

The present invention pertains to the torque phase of the clutch-to-clutch load transfer that occurs between times $t_D$ and $t_E$ hereinafter referred to as the clutch-to-clutch torque (CTCT) transfer. In the prior art the CTCT transfer operates to change the engine torque between the two clutches without altering the engine speed, thereby creating the aforementioned inescapable output torque reduction or depression indicated by the dashed line in the graph of the output torque of FIG. 2. According to the method of this invention, at this time $t_D$, engine inertia or its equivalent is used to fill as much of the output torque depression as is deemed necessary. In this way, contrary to common belief, at the end of the CTCT transfer at time $t_E$, any level of output torque, such as the range between points F—F' can be realized at the conclusion of the torque phase of the gear ratio change.

Figure 4:
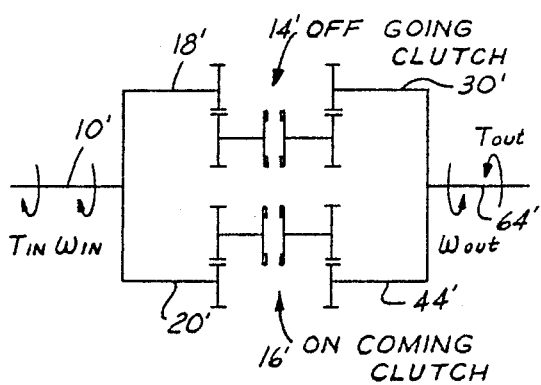
FIG. 4 is a schematic diagram showing the gear set of a multiple countershaft automatic transmission and the associated clutches whose selective engagement produces the various speed ratios.
Figure 5:
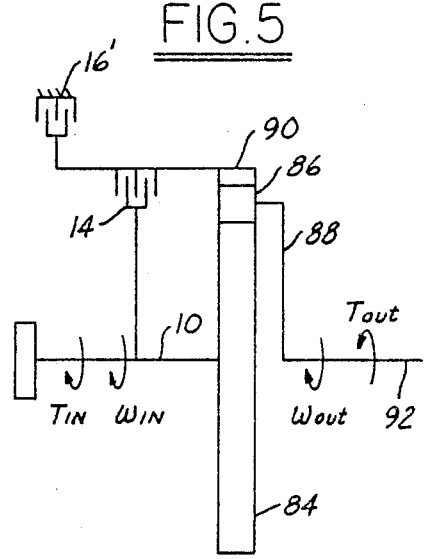
FIG. 5 is a schematic diagram illustrating a planetary gear set and the friction elements whose selective operation produces the speed ratios.

The clutch load transfer period lasts for t seconds and extends over the period from the occurrence of maximum engine speed produced by slipping the offgoing clutch 14 at point G' to the zero slip point G. The conclusion of CTCT transfer can also be identified by the occurrence of zero pressure in the offgoing clutch 14 or of a predetermined level of stroking pressure within the offgoing clutch, as represented by point H. Ideally, points G and H should substantially coincide, and the mathematical relationships that ensure this are developed subsequently for a wide class of transmissions, such as those having planetary gear sets, as illustrated in FIG. 5, and multiple countershaft gear sets, as illustrated in FIGS. 1 and 4.

Hydraulic pressure in clutches 14 and 16, and the speeds of the various shafts of the driveline are determined from the output of suitable transducers that produce an electrical signal representing the respective variable. First, by controlling the slip of clutch 14, engine speed increases by the amount $\Delta N_e$ desired to be produced at the output torque level at the beginning of the CTCT transfer. Then at point I, a maximum offgoing clutch pressure slope is chosen. Using this information, transfer constant $C_1$ is calculated off-line and stored in a memory accessible to a microprocessor onboard the motor vehicle. During the clutch load transfer at time $t_D$, when the desired slip across the offgoing clutch is present, the pressure of the offgoing clutch, point I, is measured and the offgoing clutch pressure slope $k_p$ is calculated. The clutch load transfer during the torque phase of the gear ratio change occurs over the period from $t_D$ to $t_E$ by controlling the linear increase of the pressure of the oncoming clutch 16, represented by line 80 and the linear decrease of pressure in the offgoing clutch 14, represented by line 82. The slope of the clutch pressure ramps are determined according to the mathematical development that follows. Finally, at time $t_E$ when the torque phase of the gear shift is completed, the remaining portion of the gear shift is controlled through the operation of a closed-loop control. After time $t_E$, the gearshift would proceed with closed loop speed ratio control over the oncoming clutch pressure until time $t_F$, the conclusion of the ratio change.

If pressure transducers are unavailable to produce signals representing the pressure in clutches 14 and 16, the control method of this invention can be approximated by using the closed loop speed ratio control. For example at time $t_D$, the pressure is clutch 16 is rising according to the slope of line 80; concurrently a predetermined speed ratio and slip are being maintained using a closed loop PID control. Because the pressure ramp of ongoing clutch 16 acts as a disturbance to the single integrator or PID controller, the offgoing clutch pressure will fall; concurrently, due to the unavoidable steady-state error, the clutch slip and engine speed will decrease. This action approximates the ideal curve G'—G of FIG. 2.

The method according to this invention can be applied equally well for CTCT transfer during power-on downshifts. In this instance, however, the engine speed is held below the synchronous speed by $\Delta N_e$ revolutions per minute and the ideal CTCT transfer can be achieved without output torque spikes using the inertia of the engine or a comparable rotating inertia.

Throughout the following development, the power-on upshift from the first speed ratio to the second speed ratio is described. With reference to FIG. 3, the pressure supplied to the offgoing clutch falls and increases the slip across the offgoing clutch, i.e., the difference in speed between the input member of the clutch and its output member increases, thereby removing load from the engine and increasing the speed of the engine shaft by an amount $\Delta N_e$ above the synchronous engine speed corresponding to the current operating speed ratio. The rise in engine speed occurs over a period preceding time $t_D$. Thereafter, the torque transmitted by the offgoing clutch decreases and the torque carried by the oncoming clutch increases in accordance with the following relationships:

$$T_{off}(t) = -kt + T_{off}(0) \tag{1}$$

$$T_{on}(t) = s' \cdot k \cdot t \tag{2}$$

where $T_{off}$ and $T_{on}$ are the torques of clutches 14 and 16, respectively, k is the time rate of change of the offgoing clutch torque, t is time and s' is a variable whose magnitude is in the range $1 \leq s' \leq s$. During the torque transfer, the transmission output torque is given by:

$$T_{out} = SR_{off}^d \cdot T_{off} + SR_{on}^d \cdot T_{on} \tag{3}$$

where $SR_{off}^d$ and $SR_{on}^d$ are the gear set speed ratios downstream of the offgoing clutch and the oncoming clutch, respectively.

Figure 3A:
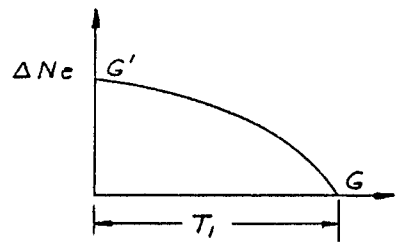
FIGS. 3A–3E show the variation of engine speed, torque of the offgoing clutch, torque of the oncoming clutch, output torque and input torque during the clutch load transfer controlled by the method of this invention.
Figure 3B:
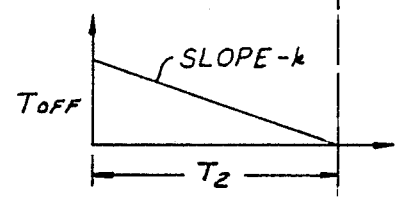
Figure 3C:
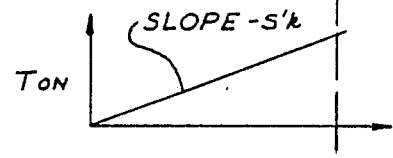
Figure 3D:
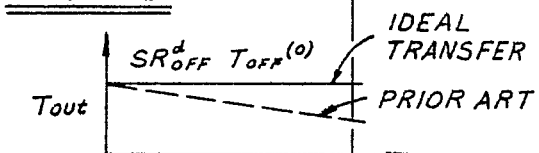
Figure 3E:
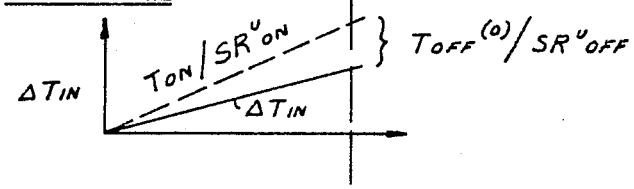

FIG. 3D is a graph of the variation with time of the transmission output torque for the ideal clutch load transfer and for the prior art clutch load transfer. Now if $$s' = s = SR_{off}^d / SR_{on}^d \tag{4}$$

then from equations (1)–(3), it follows that $T_{out}$ is constant throughout the torque phase of the clutch load transfer and is:

$$T_{out} = SR_{off}^d \cdot T_{off}(0) \tag{5}$$

However, for the conventional automatic transmission, the output torque at the end of the torque phase of the clutch load transfer reduces to $$T_{out} = SR_{on}^d \cdot T_{off}(0) \tag{6}$$

along the dashed line in FIG. 3D. Therefore, by varying s' between 1 and s, any output torque between the ideal clutch load transfer, represented by equation (5), and the conventional or prior art value, represented by equation (6), can be produced. This ideal clutch load transfer is possible because of the change in engine momentum $$I \cdot \frac{\pi}{30} \cdot \Delta N_e = \int_0^{t_1} T_{in}(t) \cdot dt \cong t_1 \cdot \Delta T_{in}(t_1)/2 \tag{7}$$

where I is the rotational inertia of the engine or of other rotating components in the driveline upstream of the transmission input shaft and $T_{in}(t)$ is indicative of the time rate of change of engine load torque due to the CTCT transfer over the interval of time t from 0 to $t_1$, during which the inertia attains synchronous speed. It can be shown that $$\Delta T_{in}(t_2) = (s'/SR_{on}^u - 1/SR_{off}^u) T_{off}(0) \tag{8}$$

where $SR_{on}^u$ and $SR_{off}^u$ are the gear set speed ratios upstream of the ongoing clutch and of the offgoing clutch, respectively, and the torque transfer occurs over an arbitrary time interval terminating at $t_2$ when torque carried by the off-going friction element is zero.

Combining equations (7) and (8) and noting that for optimal clutch load transfer $t_1 = t_2 = t$, the time to complete the torque phase of the gear shift is given by:

$$t = [I \cdot \pi/15 \cdot (\Delta N_e)]/[s'/SR^u_{on} - 1/SR^u_{off}] \; t_{off}(0) \quad (9)$$

$$\overset{\Delta}{=} 1/c_1 \; T_{off}(0)$$

where $c_1$ is a constant.

The time rate of change of torque transmitted by the offgoing clutch at time t(0) is $k = T_{off}(0)/t$. Substituting from equation (9), that time rate or slope becomes $$T^2_{off}(0) \; [s'/SR^u_{on} - 1/SR^u_{off}]/[I \cdot \pi \cdot (\Delta N_e)/15] \quad (10)$$

$$k = c_1 \; T^2_{off}(0) \quad (10a)$$

where the constant $c_1$ is:

$$c_1 = [s'/SR^u_{on} - 1/SR^u_{off}] \cdot 15/[I \cdot \pi \cdot (\Delta N_e)] \quad (11)$$

The CTCT transfer method according to this invention therefore begins by predetermining the allowable increase in engine speed that results from slipping the offgoing clutch and predetermining the value for s'. The constant $c_1$ is calculated from equation (11) using the values of certain predetermined parameters, engine inertia and the speed ratios of the gear set upstream of the respective clutches. Then, after the slip across the offgoing clutch increases sufficiently to produce the predetermined increase in engine speed, the offgoing clutch torque or pressure slope is calculated from equation (10a), where the torque of the offgoing clutch at t(0) is calculated from either engine torque or offgoing clutch pressure. Then, the two clutch torque ramps, whose slopes correspond to $-k$ and $+ks'$, are supplied to the offgoing clutch and oncoming clutch, respectively. The change in engine speed during the power-on upshift or torque across the offgoing clutch, and the clutch pressure in the offgoing clutch are monitored continuously during the gear shift. If either the change in engine speed becomes equal to zero, i.e., engine speed returns to the synchronous speed corresponding to the initial speed ratio at the beginning of the gear shift, or the torque across the offgoing clutch becomes zero, then the offgoing clutch is vented to atmosphere or its pressure is reduced substantially to a value that permits that clutch to be barely stroked. Then the pressure of the oncoming clutch is controlled through operation of the closed loop control.

In the gear set arrangement of FIG. 1, the gear set speed ratio upstream of offgoing clutch 14 and oncoming clutch 16 is equal to unity, but the gear set speed ratio downstream from the clutches are positive non-equal integers or mixed numbers. Ideally, $\Delta N_e$ is approximately 150 rpm, and s', stated in terms of s, which is the gear set speed ratio downstream of the offgoing clutch divided by the gear set speed ratio downstream of the ongoing clutch, is $$s' = \frac{s+1}{2} \quad (12)$$

The corresponding gear set speed ratios for the arrangement of FIG. 5 are:

$$SR^u_{off} = \frac{r_1 + 2r_2}{r_1} \quad (13)$$

$$SR^d_{off} = \frac{2(r_1 + r_2)}{r_1 + 2r_2} \quad (14)$$

$$SR^u_{on} = \frac{r_1 + 2r_2}{2(r_1 + r_2)} \quad (15)$$

$$SR^d_{on} = \frac{2(r_1 + r_2)}{r_1 + 2r_2} \quad (16)$$

where $r_1$ is the radius of sun gear 84 and $r_2$ is the radius of the planetary pinions 86, which are rotatably supported on carrier 88 and are engaged continuously with ring gear 90. The oncoming clutch 14 selectively connects ring gear 90 to the engine crankshaft 10; the offgoing brake 16' selectively connects the ring gear to the transmission casing, thereby preventing rotation of the ring gear.

The corresponding gear set speed ratios of the gear arrangement shown in FIG. 4 depend upon the corresponding sizes of the meshing gears.

The slopes of the friction element pressures are related linearly to k, the slope of the offgoing clutch torque, the relationship:

$$k_p = k/G \quad (17)$$

where $K_p$ is the slope of the clutch pressure ramp and G is the clutch gain.

Having described the preferred embodiments of my invention, what I claim and desire to secure by U.S. Letters Patent is:

1. A method for controlling transfer of torque from a first friction element to a second friction element while making a speed ratio change from a first speed ratio to a second speed ratio in an automatic transmission adapted for driveable connection to an engine and having a gearset and an output, the friction elements being selectively engaged and disengaged in accordance with the magnitude of hydraulic pressure supplied to the friction elements, comprising:

reducing pressure supplied to the first friction element until engine speed increases by a predetermined amount $N_e$ above synchronous speed for the first speed ratio;

determining the rotating inertia of the engine I, the speed ratio of the transmission gearset located between the engine and second friction element $SR_2^u$, the speed ratio of the transmission gearset located between the engine and first friction element $SR_1^u$, the speed ratio of the transmission gearset located between the transmission output and first friction element $SR_1^d$, the speed ratio of the transmission gearset located between the transmission output and second friction element $SR_2^d$, the value of the ratio $s = SR_1^d/SR_2^d$, and the value of a constant s' such that $1 \leq s' \leq s$;

calculating transfer constant $c_1$ from the relationship $$c_1 = [s'/SR_2^u - 1/SR_1^u] \cdot 15/[I \cdot \pi \cdot N_e];$$

determining the magnitude of torque to be transferred from the first friction element to the second friction element $T_1(0)$;

calculating the time rate of decrease of torque carried by the first friction element k from the relationship $k = c_1[T_1(0)]^2$;

concurrently decreasing at time rate k pressure supplied to the first friction element and increasing at time rate ks' pressure supplied to the second friction element;

reducing pressure supplied to the first friction element substantially to zero when engine speed declines to synchronous speed for the second speed ratio.

2. The method of claim 1 further comprising setting the value of constant s' between the limits $1 \leq s' \leq s$ such that torque at the transmission output $T_{out}$ after transfer of torque to the second friction element from the first friction element is $[SR_2^d][T_1(0)]$.

3. The method for controlling transfer of torque from a first friction element to a second friction element while making a speed ratio change from a first speed ratio to a second speed ratio in an automatic transmission adapted for driveable connection to an engine and having a gearset and an output, the friction elements being selectively engaged and disengaged in accordance with the magnitude of hydraulic pressure supplied to the friction elements, comprising:

reducing pressure supplied to the first friction element until engine speed increases by a predetermined amount $N_e$ above synchronous speed for the first speed ratio;

determining the rotating inertia of the engine I, the speed ratio of the transmission gearset located between the engine and second friction element $SR_2^u$, the speed ratio of the transmission gearset located between the engine and first friction element $SR_1^u$, the speed ratio of the transmission gearset located between the transmission output and first friction element $SR_1^d$, the speed ratio of the transmission gearset located between the transmission output and second friction element $SR_2^d$, the value of the ratio $s = SR_1^d/SR_2^d$, and the value of a constant s' such that $1 \leq s' \leq s$;

calculating transfer constant $c_1$ from the relationship $$c_1 = [s'/SR_2^u - 1/SR_1^u] \cdot 15/[I \cdot \pi \cdot Ne];$$

determining the magnitude of torque to be transferred from the first friction element to the second friction element $T_1(0)$ ;

calculating the time rate of decrease of torque carried by the first friction element k from the relationship $k = c_1[T_1(0)]^2$;

concurrently decreasing at time rate k pressure supplied to the first friction element and increasing at time rate ks' pressure supplied to the second friction element;

reducing pressure supplied to the first friction element substantially to zero when time measured from the beginning of increase of pressure supplied to the second friction element equals $1/c_1T_1(0)$.

4. The method of claim 3 further comprising setting the value of constant s' between the limits $1 \leq s' \leq s$ such that torque at the transmission output $T_{out}$ after transfer of torque to the second friction element from the first friction element is $[SR_2^d][T_1(0)]$.

5. A method for controlling transfer of torque from a first friction element to a second friction element while making a speed ratio change from a first speed ratio to a second speed ratio in an automatic transmission adapted for driveable connection to an engine and having a gearset and an output, the friction elements being selectively engaged and disengaged in accordance with the magnitude of hydraulic pressure supplied to the friction elements, comprising:

reducing pressure supplied to the first friction element until engine speed increases by a predetermined amount $N_e$ above synchronous speed for the first speed ratio;

determining the rotating inertia of the engine I, the speed ratio of the transmission gearset located between the engine and second friction element $SR_2^u$, the speed ratio of the transmission gearset located between the engine and first friction element $SR_1^u$, the speed ratio of the transmission gearset located between the transmission output and first friction element $SR_1^d$, the speed ratio of the transmission gearset located between the transmission output and second friction element $SR_2^d$, the value of the ratio $s = SR_1^d/SR_2^d$;

calculating transfer constant $c_1$ from the relationship $$c_1 = [s/SR_2^u - 1/SR_1^u] \cdot 15/[I \cdot \pi \cdot Ne];$$

determining the magnitude of torque to be transferred from the first friction element to the second friction element $T_1(0)$;

calculating the time rate of decrease of torque carried by the first friction element k from the relationship $k = c_1[T_1(0)]^2$;

concurrently decreasing at time rate k pressure supplied to the first friction element and increasing at time rate ks pressure supplied to the second friction element;

reducing pressure supplied to the first friction element substantially to zero when engine speed declines to synchronous speed for the second speed ratio.

6. A method for controlling transfer of torque from a first friction element to a second friction element while making a speed ratio change from a first speed ratio to a second speed ratio in an automatic transmission adapted for driveable connection to an engine and having a gearset and an output, the friction elements being selectively engaged and disengaged in accordance with the magnitude of hydraulic pressure supplied to the friction elements, comprising:

reducing pressure supplied to the first friction element until engine speed increases by a predetermined amount $N_e$ above synchronous speed for the first speed ratio;

determining the rotating inertia of the engine I, the speed ratio of the transmission gearset located between the engine and second friction element $SR_2^u$, the speed ratio of the transmission gearset located between the engine and first friction element $SR_1^u$, the speed ratio of the transmission gearset located between the transmission output and first friction element $SR_1^d$, the speed ratio of the transmission gearset located between the transmission output and second friction element $SR_2^d$, the value of the ratio $s = SR_1^d/SR_2^d$;

calculating transfer constant $c_1$ from the relationship $$c_1 = [s/SR_2^u - 1/SR_1^u] \cdot 15/[I \cdot \pi \cdot Ne];$$

determining the magnitude of torque to be transferred from the first friction element to the second friction element $T_1(0)$;

calculating the time rate of decrease of torque carried by the first friction element k from the relationship $k = c_1[T_1(0)]^2$;

concurrently decreasing at time rate k pressure supplied to the first friction element and increasing at time rate ks pressure supplied to the second friction element;

reducing pressure supplied to the first friction element substantially to zero when time measured from the beginning of increase of pressure supplied to the second friction element equals $1/c_1T_1(0)$.

* * * * *